United States Patent [19]

Hood et al.

[11] 4,380,910
[45] Apr. 26, 1983

[54] MULTI-STAGE INDIRECT-DIRECT EVAPORATIVE COOLING PROCESS AND APPARATUS

[75] Inventors: Larry M. Hood, Albuquerque; Doy M. West, Tijeras, both of N. Mex.

[73] Assignee: Aztech International, Ltd., Albuquerque, N. Mex.

[21] Appl. No.: 292,367

[22] Filed: Aug. 13, 1981

[51] Int. Cl.³ .......................................... F25D 17/06
[52] U.S. Cl. ........................................... 62/91; 62/95; 62/271; 62/304
[58] Field of Search ...................... 62/91, 95, 271, 304

[56] References Cited

U.S. PATENT DOCUMENTS

| 20,469 | 8/1937 | Crawford | 62/171 |
|---|---|---|---|
| 1,990,094 | 2/1935 | Ray | 62/176 |
| 2,162,158 | 6/1939 | Coey | 62/129 |
| 2,211,886 | 8/1940 | Dudley | 62/95 |
| 2,464,766 | 3/1949 | Pennington | 62/139 |
| 2,488,116 | 11/1949 | Berlowitz | 62/90 |
| 3,116,612 | 1/1964 | Pennington | 62/171 |
| 3,718,008 | 2/1973 | Zusmanovich | 62/309 |
| 3,808,832 | 5/1974 | Zusmanovich | 62/309 |
| 3,812,685 | 5/1974 | Brown | 62/93 |
| 3,861,164 | 1/1975 | Brown | 62/91 |
| 3,890,797 | 6/1975 | Brown | 62/91 |
| 3,905,205 | 9/1975 | Zusmanovich | 62/309 |
| 4,023,949 | 5/1977 | Schlom et al. | 62/309 |
| 4,156,351 | 5/1979 | Schlom et al. | 62/121 |
| 4,180,985 | 1/1980 | Northrup, Jr. | 62/95 |

OTHER PUBLICATIONS

"Indirect/Direct Evaporative Cooling System," by Neil Eskra, *Ashrae Journal*, 1980, pp. 21-25.

Primary Examiner—Ronald C. Capossela
Attorney, Agent, or Firm—Dowell & Dowell

[57] ABSTRACT

An evaporative cooling process and apparatus in which air is cooled through at least three or more stages of direct and indirect cooling employing recirculating water in each of the stages.

12 Claims, 3 Drawing Figures

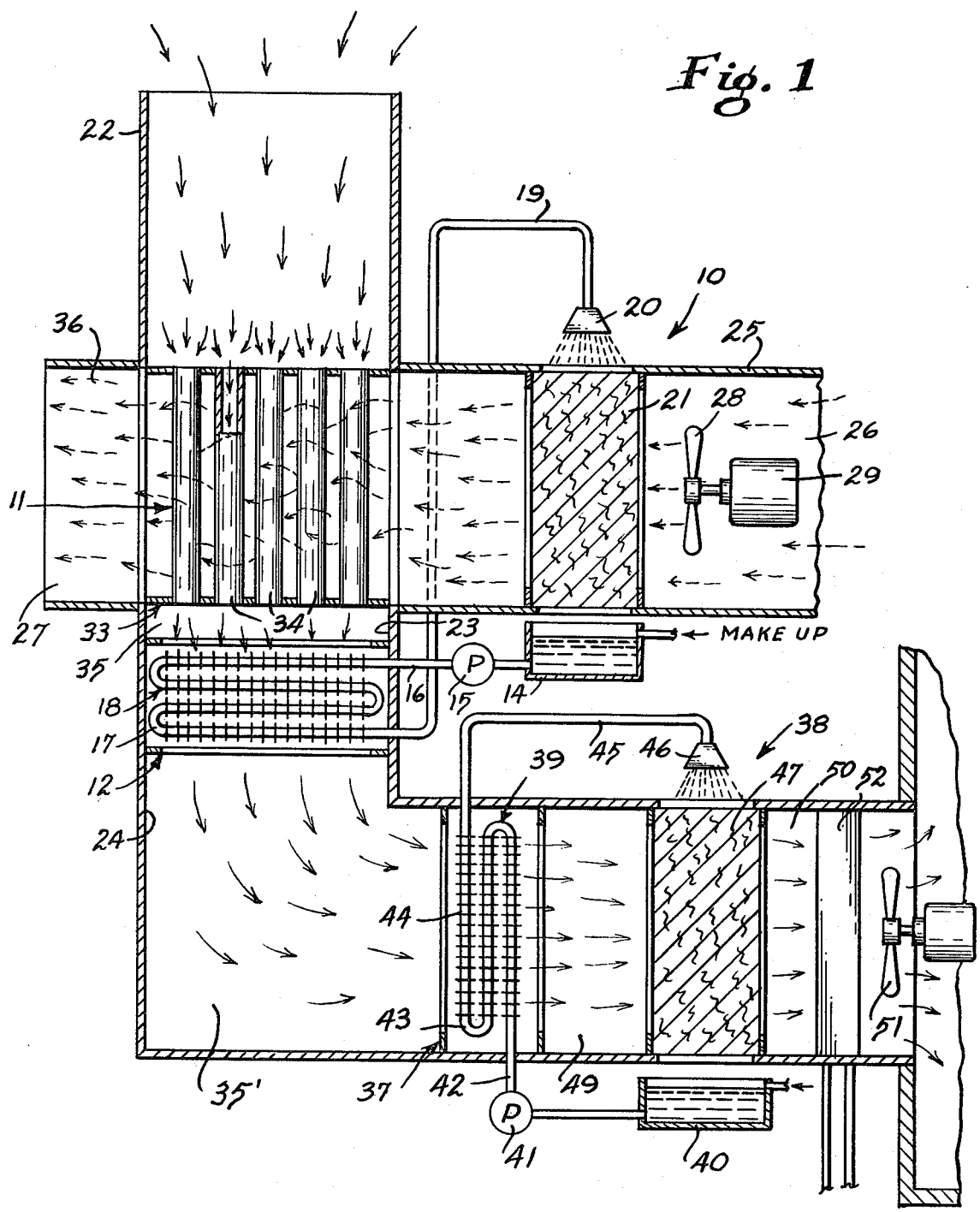

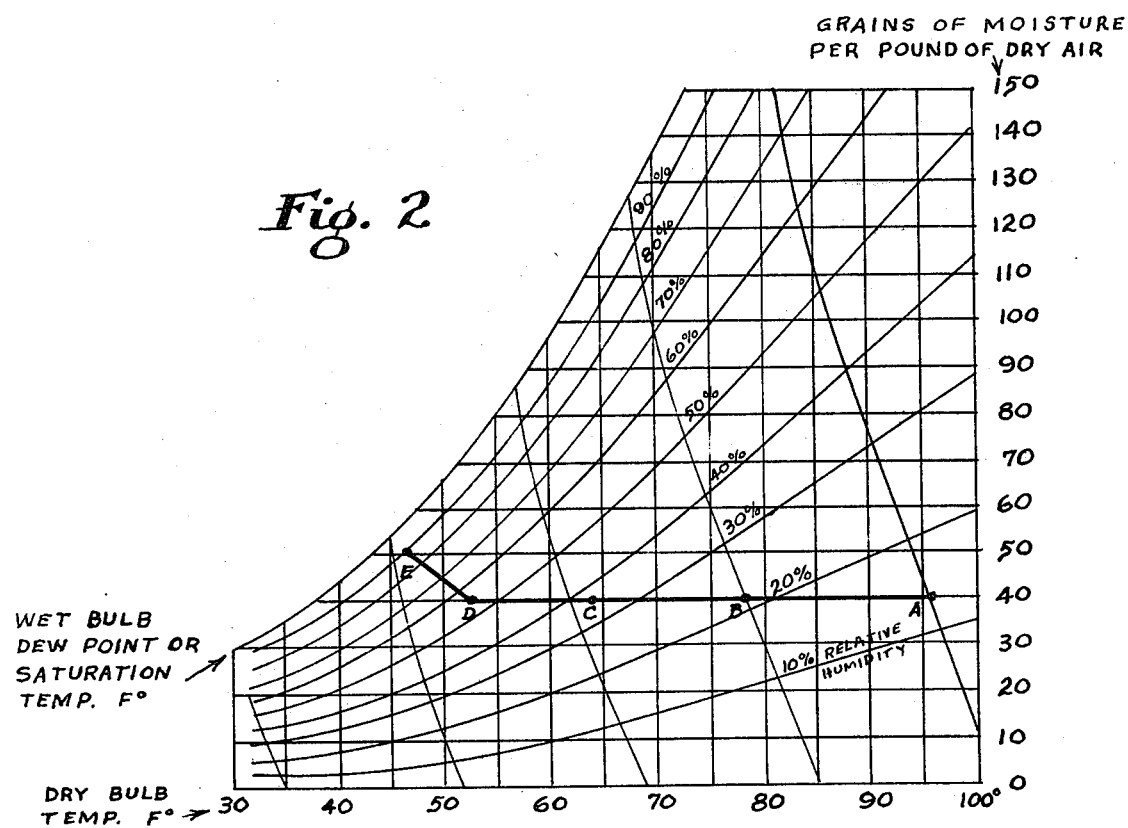
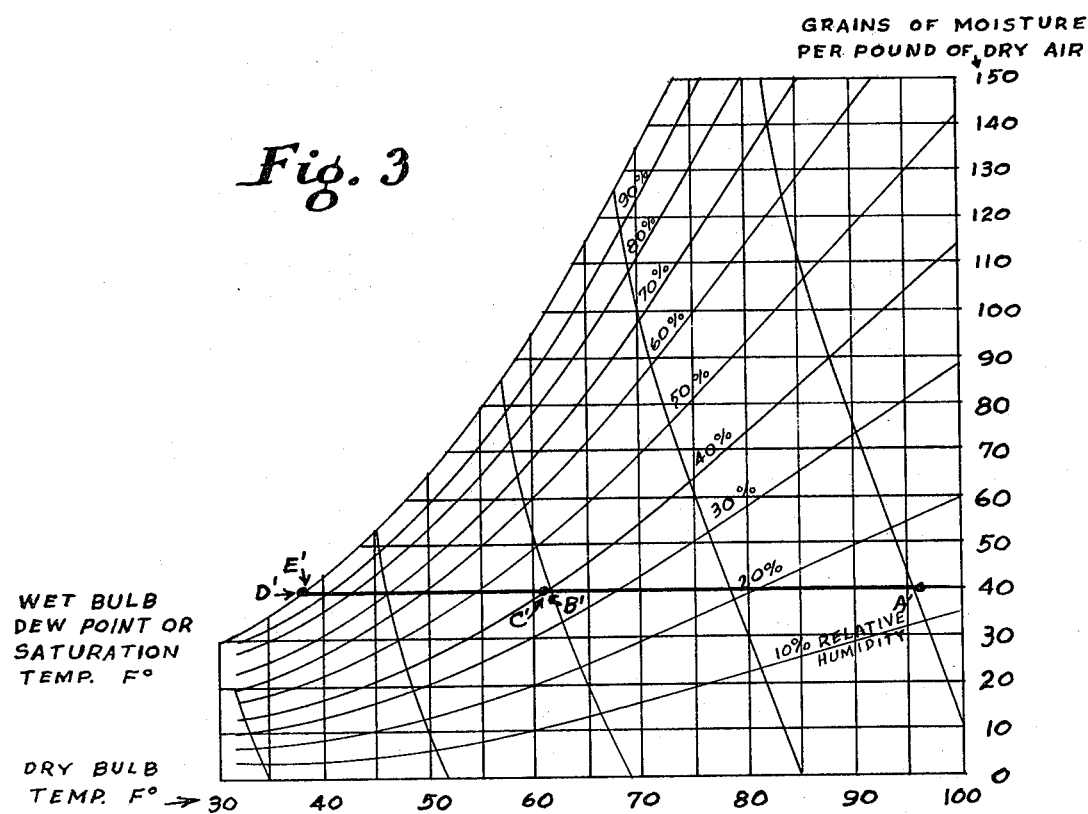

MULTI-STAGE INDIRECT-DIRECT EVAPORATIVE COOLING PROCESS AND APPARATUS

FIELD OF THE INVENTION

This invention relates to the cooling of air primarily for human comfort in which the supply air initially has a relatively low humidity so that such air may be both directly and indirectly cooled through stages of evaporative cooling using recirculating water.

BACKGROUND OF THE INVENTION

The use of evaporative cooling for both liquid and air has been long known. In relatively arid regions such as the southwestern portion of the United States, evaporative cooling has been practiced for conditioning air for human comfort. This has been practiced with varying degrees of success, particularly in relatively low demand systems such as for residences. In recent years, particularly because of the necessity to conserve energy, there has been an increased demand for improvement in efficiency and operating characteristics of systems of this kind.

Examples of the prior art disclosures of evaporative cooling for air and water systems are found in the following U.S. patents: Ray U.S. Pat. No. 1,990,194, Crawford U.S. Pat. No. Re. 20,469, Coey U.S. Pat. No. 2,162,158, Pennington U.S. Pat. No. 2,464,766, Berlowitz U.S. Pat. No. 2,488,116, Pennington U.S. Pat. No. 3,116,612, Zusmanovich U.S. Pat. Nos. 3,718,008, 3,808,832, and 3,905,205, Brown U.S. Pat. Nos. 3,812,686, 3,861,164 and 3,890,797, Schlom U.S. Pat. No. 4,023,949 and 4,156,351. See also "Indirect/Direct Evaporative Cooling Systems" ASHRAE Journal, May 1980, pp. 21–25, article by Neil Eskra.

SUMMARY OF THE INVENTION

The invention is embodied in a process and apparatus in which a supply of low humidity air is introduced into an evaporative cooler where such air is indirectly cooled without an increase in moisture content by a first recirculating water evaporative unit in a first and second stage unit and then is further indirectly and directly cooled by a second recirculating water evaporative unit in a third and fourth stage unit. In the third and fourth stages, the air which is cooled indirectly is used to cool the recirculating water in the direct cooling phase of the evaporative unit of such fourth stage.

Accordingly it is an object of the invention to provide a combination of stages of indirect and direct cooling units with recirculating water in order to cool relatively hot dry air to a relatively low dry bulb temperature and with only a slight increase in its total moisture content.

It is a further object of the invention to cool relatively hot dry air to a low dry bulb temperature and with only a slight increase in its total moisture content and with relatively low power consumption.

These and other objects of the invention will become apparent from the following description in conjunction with the accompanying drawings.

BRIEF DESCRIPTION OF THE DRAWINGS

FIG. 1 is a schematic circuit diagram of a cooling system in accordance with the present invention.

FIG. 2 is a psychrometric chart illustrating the various stages of air in an illustrative example using the embodiment of FIG. 1.

FIG. 3 is a comparative psychrometric chart, for comparison purposes, assuming 100% efficiency in heat transfer in the equipment.

DESCRIPTION OF THE PREFERRED EMBODIMENT

With further reference to the drawings, an evaporative cooler apparatus 10 is provided having a first stage 11 and a second stage 12. The second stage includes a first water recirculating unit in which water is pumped from a sump 14 by a pump 15 through a pipe 16, through coils 17, of a heat exchanger 18 and then through a pipe 19 to a spray discharge 20 which discharges such water into a water saturated media 21 and back to sump 14. The coils 17 of the heat exchanger 18 may preferably be of a conventional finned type and housed in a duct 22 having an inlet 23 and a discharge 24 from the heat exchanger 18. A primary air stream, which preferably is low humidity outside air, flows through the duct 22 into the apparatus.

The saturated media 21 is preferably a pad of suitably treated cellulose that maintains a high degree of saturation. The media pad 21 is suitably supported in a duct 25 so that a secondary air stream having an inlet 26 and a discharge 27 may be circulated through the media pad 21 by a blower 28 driven by a motor 29. If desired, the air for the secondary air stream may be supplied from the area being cooled by the air in the primary air stream.

Upstream of the heat exchanger 18 and downstream of the saturated media pad 21 is the first stage 11, which includes an air to air heat exchanger 33 which may have a series of spaced ducts or tubes 34 through which the primary air passes before entering heat exchanger 18 and around which the secondary air from the saturated media pad 21 also passes, the former being discharged in area 35 within the duct 22 and the latter being discharged in area 36 within the duct 25. While location of heat exchanger 33 upstream of heat exchanger 18 generally provides better efficiency, under some conditions heat exchanger 33 may be located downstream of heat exchanger 18. The air of the secondary air stream in the area 36 may either be discharged outside or used for cooling other equipment or media.

From the discharge side of the heat exchanger 33 the air in space 35 flows through heat exchanger 18 and then into space 35' to the third and fourth stages 37 and 38, which include a second water recirculating unit 39. In such second unit, water is pumped from a sump 40 by a pump 41 through a pipe 42 into the finned coils 43 of a heat exchanger 44 and then through a pipe 45 to a spray discharge 46 which discharges such water onto a saturation media pad 47 and back to the sump 40. The primary air from space 35' in duct 22 passes first through the indirect heat exchanger 44 to discharge area 49 then through saturation media pad 47 in the second water recirculating unit 39 to discharge area 50, through air circulator 51 such as a motor driven blower or the like and then into the space to be conditioned.

Referring to FIGS. 1 and 2, an illustrative treatment of air may be described as follows. Supply air is available, for example, during the summer in Albuquerque, N.M. with a dry bulb temperature of 96° F. and wet bulb temperature of 61° F. This is illustrated at point A on chart FIG. 2. In the first stage of cooling the supply air passes through the air-to-air heat exchanger 33 where its dry bulb temperature is reduced to 78° F., and wet bulb to 55° F., without any increase in its dew point of 38° F. Its relative humidity, however, increases from 13% at point A to 23% at point B.

In the indirect heat exchanger 18 a gain in efficiency is achieved in which the air is further cooled from a dry bulb of 78° F. to 64.5° F. at point C, there being no change in the dew point and the relative humidity increasing to 38%.

In view of the considerably lowered wet bulb temperature that the air now has in space 35 (point C on the chart of FIG. 2), it may now be used for substantial further gain in its cooling ability. Thus the air then passes through the indirect heat exchanger 44 and then through the direct heat exchange media pad 47 before it is discharged into the conditioned space. In heat exchanger 44 the air reaches a dry bulb temperature of 52.5° F., a wet bulb of 45° F. and a relative humidity of 58%, without any change in its dew point. This is shown at point D on the chart of FIG. 2.

From the discharge side of the heat exchanger 44 the 45° F. wet bulb air is then used to cool the water that is recirculated through the saturation media 47, at the same time that the air is further cooled to a dry bulb temperature of 46.5° F., only slightly above its wet bulb temperature of 45° F. and dew point of 44° F. and having a relative humidity at discharge of 90% (point E on the chart).

It will be seen, therefore, that the entering air of 96° F. dry bulb temperature is cooled to the relatively extremely low temperature of 46.5° F. which is suitable for both residential and commercial use. This may be contrasted with an ordinary refrigerated air conditioning unit of compressor, condenser, evaporator type, requiring high energy which in an ordinary single stage system would cool the air to 58° F. dry bulb and 55° F. wet bulb.

It has been found that because of the inherent efficiencies of the present system that net sensible cooling may be accomplished at a rate below 400 cubic feet per minute per ton of refrigeration compared with the required rate of 400 to 500 cubic feet per minute per ton of refrigeration by standard refrigeration equipment and with a 1,000 cubic feet per minute per ton of refrigeration produced by ordinary single stage evaporative coolers.

For purposes of comparison, the chart of FIG. 3 illustrates the positions of points A', B', C', D' and E' if the efficiency were 100% in the various heat exchangers. It can be seen, therefore, in the overall picture how closely the present system approaches what can be accomplished if the heat exchanger would operate at 100% efficiency.

While the system as described is preferred for maximum operating efficiency, it will be understood that various modifications may be employed. As an example, an evaporator of a refrigerant cooling unit 52 may be employed downstream of the fourth stage 38 in the event that conditions require further lowering of the dry bulb temperature.

Under certain conditions the system may be rearranged so that the heat exchanger 33 is located downstream of heat exchanger 18 instead of upstream as shown in FIG. 1.

It is also contemplated that in certain situations the system may be simplified and operate satisfactorily by the elimination of either heat exchanger 18 (in which case pump 15 will merely recirculate the water through the media 21) or heat exchanger 33. Such simplified system may be used with an evaporator of a conventional refrigerant cooling system 52.

We claim:

1. The process of cooling a first air stream, comprising the steps of: passing the air stream through a first heat exchanger in heat exchange relationship with a second air stream passing through a recirculating first body of water that is evaporatively cooled by said second air stream, passing said first air stream through a second heat exchanger in heat exchange relationship but out of contact with a recirculating second body of water that is evaporatively cooled downstream by said first air stream, and passing said first air stream in direct contact heat exchange relationship with a third heat exchanger which includes said second body of evaporatively cooled water.

2. The invention of claim 1, including the step of: passing said first air stream through a fourth heat exchanger in heat exchange relationship with but out of contact with said recirculating first body of water after said first air stream passes through said first heat exchanger.

3. The invention of claim 1 or claim 2, including the step of: passing said first air stream in heat exchange relationship with the evaporator of a refrigeration system subsequent to its passing through said third heat exchanger.

4. The process of cooling a first air stream, comprising the steps of: passing the air stream through a first heat exchanger in heat exchange relationship with but out of contact with a recirculating first body of water that is evaporatively cooled by a second air stream, passing said first air stream through a second heat exchanger in heat exchange relationship with but out of contact with a recirculating second body of water that is evaporatively cooled downstream by said first air stream, and passing said first air stream in direct contact heat exchange relationship with a third heat exchanger which includes said second body of evaporatively cooled water.

5. The invention of claim 4, including the step of: passing said first and second air streams through a fourth heat exchanger in indirect heat exchange relationship with each other prior to said first air stream passing through said second heat exchanger.

6. The invention of claim 5, in which said fourth heat exchanger is upstream of said first heat exchanger.

7. The invention of claim 4, 5 or 6, including the step of: passing said first air stream in heat exchange relationship with the evaporator of a refrigeration system subsequent to its passing through said third heat exchanger.

8. An air conditioning apparatus comprising, a first body of evaporatively cooled water, a first heat exchanger, a first air stream passing through said first heat exchanger, a second air stream cooled by said water and passing through said first heat exchanger but out of contact with said first air stream, a second heat exchanger having conduit means through which a second body of water flows, means for flowing said second body of water over an extended surface area and recirculating it through said conduit means, means for passing said first air stream through said second heat exchanger in heat exchange relationship with said conduit means, and then passing said first air stream through a third heat exchanger which includes the extended surface area of said second body of water.

9. An air conditioning apparatus comprising a first heat exchanger having first conduit means through which a first body of water flows, means for flowing said first body of water over a first extended surface area and recirculating it through said first conduit means in said first heat exchanger, means for passing a first air stream through said first heat exchanger in heat exchange relationship with said first conduit means, means for passing a second air stream over the extended surface area of the first body of water, a second heat exchanger having second conduit means through which a second body of water flows, means for flowing said second body of water over a second extended surface area and recirculating it through said second conduit means, means for passing said first air stream through said second heat exchanger in heat exchange relationship with said second conduit means, and then passing said first air stream over a third heat exchanger which includes the extended surface area of said second body of water.

10. The invention of claim 9, and a fourth heat exchange, said fourth heat exchanger receiving said first air stream from said first heat exchanger and said second air stream from said first body of water in heat exchange relationship with each other.

11. The invention of claim 8, 9 or 10, and a refrigeration system having evaporative cooling means, and means for passing the air flow from said second body of water in heat exchange relationship with said evaporative cooling means.

12. The invention of claim 9, in which said first and said second heat exchanger are finned coils, and said first and second extended surface areas are saturated media pads.

* * * * *